US012763595B2

United States Patent

(12) United States Patent
Vashi

(10) Patent No.: US 12,763,595 B2
(45) Date of Patent: Oct. 13, 2026

(54) BATTERY CHARGER INCLUDING A SEALED BATTERY INTERFACE

(71) Applicant: MILWAUKEE ELECTRIC TOOL CORPORATION, Brookfield, WI (US)

(72) Inventor: Bhaumik M. Vashi, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 853 days.

(21) Appl. No.: 18/182,599

(22) Filed: Mar. 13, 2023

(65) Prior Publication Data

US 2023/0291215 A1 Sep. 14, 2023

Related U.S. Application Data

(60) Provisional application No. 63/319,421, filed on Mar. 14, 2022.

(51) Int. Cl.
*H01M 10/46* (2006.01)
*H02J 7/70* (2026.01)

(52) U.S. Cl.
CPC .................................... *H02J 7/751* (2026.01)

(58) Field of Classification Search
CPC .............................. H02J 7/0042; H02J 7/0045
USPC ................. 320/107, 111, 114, 115, 150, 153
See application file for complete search history.

(56) References Cited

U.S. PATENT DOCUMENTS 6,967,464 B2 11/2005 Heigl et al.
7,589,493 B2 9/2009 Satsuma
7,733,054 B2 6/2010 Phillips et al.
7,859,220 B2 12/2010 Bushong et al.
7,868,588 B2 1/2011 Altekruse et al.
RE42,468 E 6/2011 Heigl et al.
8,994,339 B1 3/2015 Kam
9,150,106 B2 10/2015 Park et al.
9,225,184 B2 12/2015 Rief
9,608,461 B2 3/2017 Chen et al.
9,762,073 B2 9/2017 Koch et al.
9,917,452 B2 3/2018 Kishima et al.
(Continued)

FOREIGN PATENT DOCUMENTS

CN 104868524 A * 8/2015 ............ H02J 7/0068
EP 2448036 A1 * 5/2012 ................ H02J 7/00
(Continued)

OTHER PUBLICATIONS

Machine translate of JP2013192282A (Sep. 26, 2013) (Year: 2013).*
Extended European Search Report for Application No. 23161691.3 dated Aug. 7, 2023 (7 pages).

*Primary Examiner* — Edward Tso
(74) *Attorney, Agent, or Firm* — Michael Best & Friedrich LLP

(57) ABSTRACT

The present disclosure provides a battery charger to which a battery pack may be coupled. The battery charger includes a housing, a terminal block, and a receptacle. The housing includes a battery receiving interface that defines a recess that extends inwardly toward a cavity defined in the housing. The terminal block is disposed in the recess. The receptacle is coupled to the battery receiving interface and a seal is interposed between the receptacle and the battery receiving interface. The battery receiving interface, the receptacle, and the seal cooperate to form a chamber between the terminal block and the cavity.

20 Claims, 6 Drawing Sheets

(56) References Cited

U.S. PATENT DOCUMENTS

| | | | | |
|---|---|---|---|---|
| 10,270,141 | B2 | 4/2019 | Piggott et al. | |
| 10,340,737 | B2 | 7/2019 | Jung et al. | |
| 10,547,186 | B2 | 1/2020 | Namiki | |
| 10,601,236 | B2 | 3/2020 | Seidel et al. | |
| 10,630,088 | B2 | 4/2020 | Seidel et al. | |
| 10,674,618 | B2 | 6/2020 | Choksi et al. | |
| 10,686,318 | B2 | 6/2020 | Taga | |
| 11,056,895 | B2 | 7/2021 | Qin et al. | |
| 11,411,278 | B2 | 8/2022 | Radovich et al. | |
| 2022/0190392 | A1* | 6/2022 | Takahashi | H01M 50/204 |

FOREIGN PATENT DOCUMENTS

| | | | | | |
|---|---|---|---|---|---|
| JP | 2013099119 | A | * | 5/2013 | |
| JP | 2013192282 | A | | 9/2013 | |
| WO | 2021210629 | A1 | | 10/2021 | |
| WO | WO-2022247517 | A1 | * | 12/2022 | H01M 50/247 |

* cited by examiner

BATTERY CHARGER INCLUDING A SEALED BATTERY INTERFACE

CROSS-REFERENCE TO RELATED APPLICATIONS

This application claims priority to U.S. Provisional Patent Application 63/319,421, filed Mar. 14, 2022, the entire content of which is incorporated by reference herein.

FIELD

The present disclosure relates to a battery charger, in particular, a battery charger having a sealed interface.

BACKGROUND

Battery chargers are frequently used in outdoor settings in which exposure to water may occur. Ingress of water into the battery charger would negatively affect operation of the battery charger. A sealing interface to prevent water ingress into the battery charger is therefore beneficial to maintain proper operation of the battery charger.

SUMMARY

The disclosure provides, in one aspect, a battery charger to which a battery pack may be coupled. The battery charger includes a housing that defines a cavity. The housing includes a battery receiving interface that defines a recess that extends inwardly toward the cavity. A terminal block is disposed in the recess. A receptacle is coupled to the battery receiving interface. A seal is interposed between the receptacle and the battery receiving interface. The battery receiving interface, receptacle, and the seal cooperate to form a camber between the terminal block and the cavity.

The disclosure provides, in another aspect, a battery charger to which a battery pack may be coupled. The battery charger includes a battery receiving interface, a chamber, a terminal block, and a plurality of wires. The battery receiving interface has an exterior receiving side and an opposite interior side. The chamber is disposed on the interior side and is configured to receiving and regain fluid introduced to the exterior receiving side of the battery receiving interface. The terminal block is disposed in the battery receiving interface. The plurality of wires are coupled to the terminal block and extend through the chamber.

The disclosure provides, in another aspect, a battery charger to which a battery pack may be coupled including a housing, a terminal block, a passage, a receptacle, and a seal. The housing includes a battery receiving interface defining a recess that extends inward to a cavity defined in the housing. The terminal block is disposed in the recess and has a plurality of wires extending therefrom. The passage is defined between the terminal block and the battery receiving interface. The receptacle is coupled to the battery receiving interface and includes a channel defined therein. The seal is interposed between the receptacle and the battery receiving interface. The battery receiving interface, the receptacle, and the seal cooperate to form a chamber between the terminal block and the cavity. The channel extends about a majority of the perimeter of the chamber. The chamber is in fluid communicate with the passage. The seal has a gasket and a grommet. The gasket is disposed in the channel and overmolded on the receptacle. The grommet is interposed between the receptacle and the housing and has a plurality of holes through which the plurality of wires extend.

Other aspects of the disclosure will become apparent by consideration of the detailed description and accompanying drawings.

DETAILED DESCRIPTION

Before any embodiments of the disclosure are explained in detail, it is to be understood that the subject matter is not limited in its application to the details of construction and the arrangement of components set forth in the following description or illustrated in the following drawings. The subject matter is capable of other embodiments and of being practiced or of being carried out in various ways.

Figure 1:
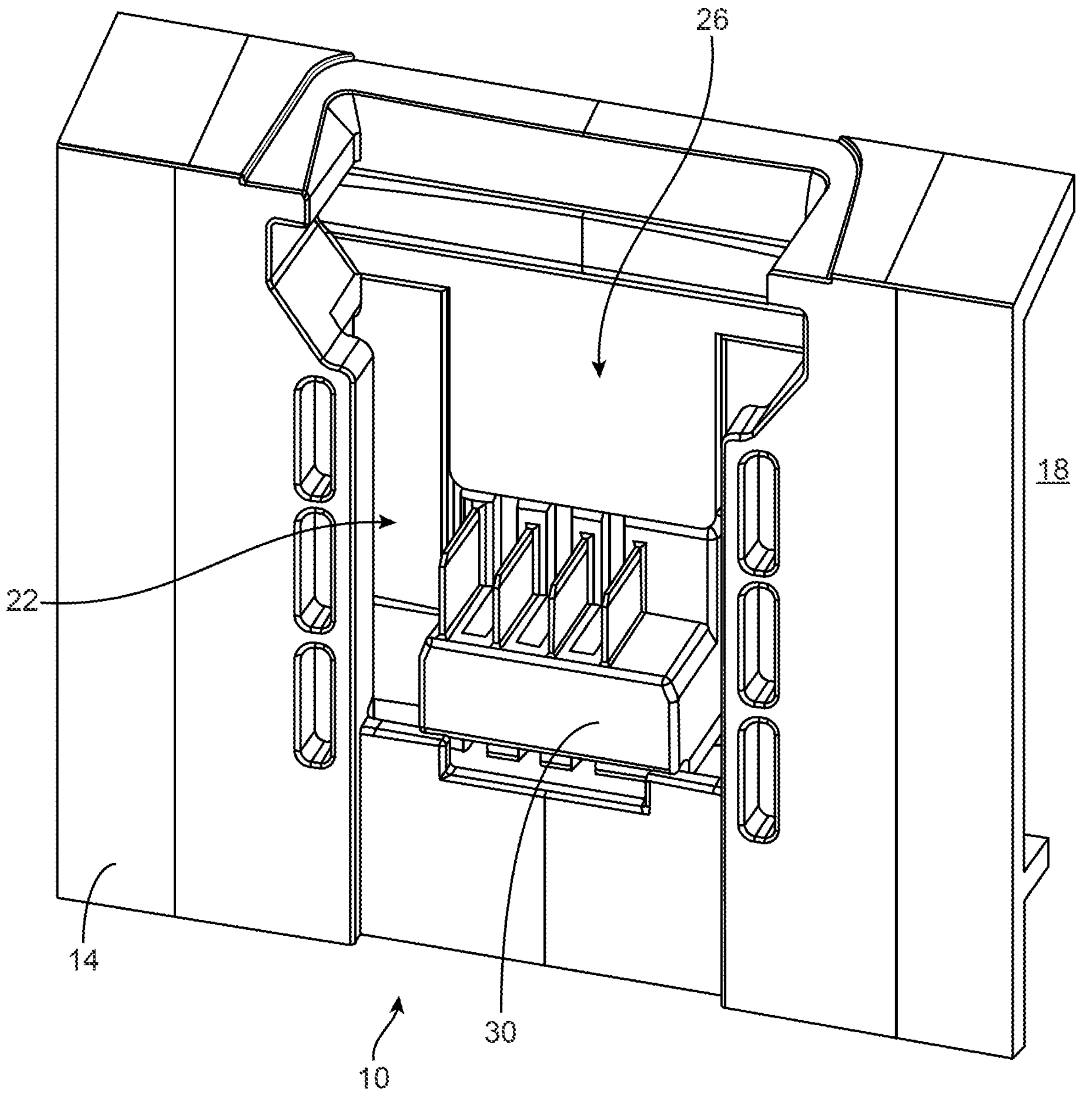
FIG. 1 is a perspective view illustrating a battery charger including a sealed battery interface according to the present disclosure.

FIG. 1 illustrates an embodiment of the battery charger 10 to which a rechargeable battery (not shown) can be coupled. The battery charger 10 includes a housing 14 that defines a cavity 18 containing battery cells, printed circuit board assemblies, or other components configured to electrically recharge a rechargeable battery. The housing 14 includes a battery receiving interface 22 which defines a recess 26. The recess 26 extends inward toward the cavity 18. A terminal block 30, to which the battery pack is electrically coupled (e.g., by sliding the battery pack relative to the housing 14 to engage the battery pack with the terminal block 30) when recharging, is disposed in the recess 26.

Figure 2:
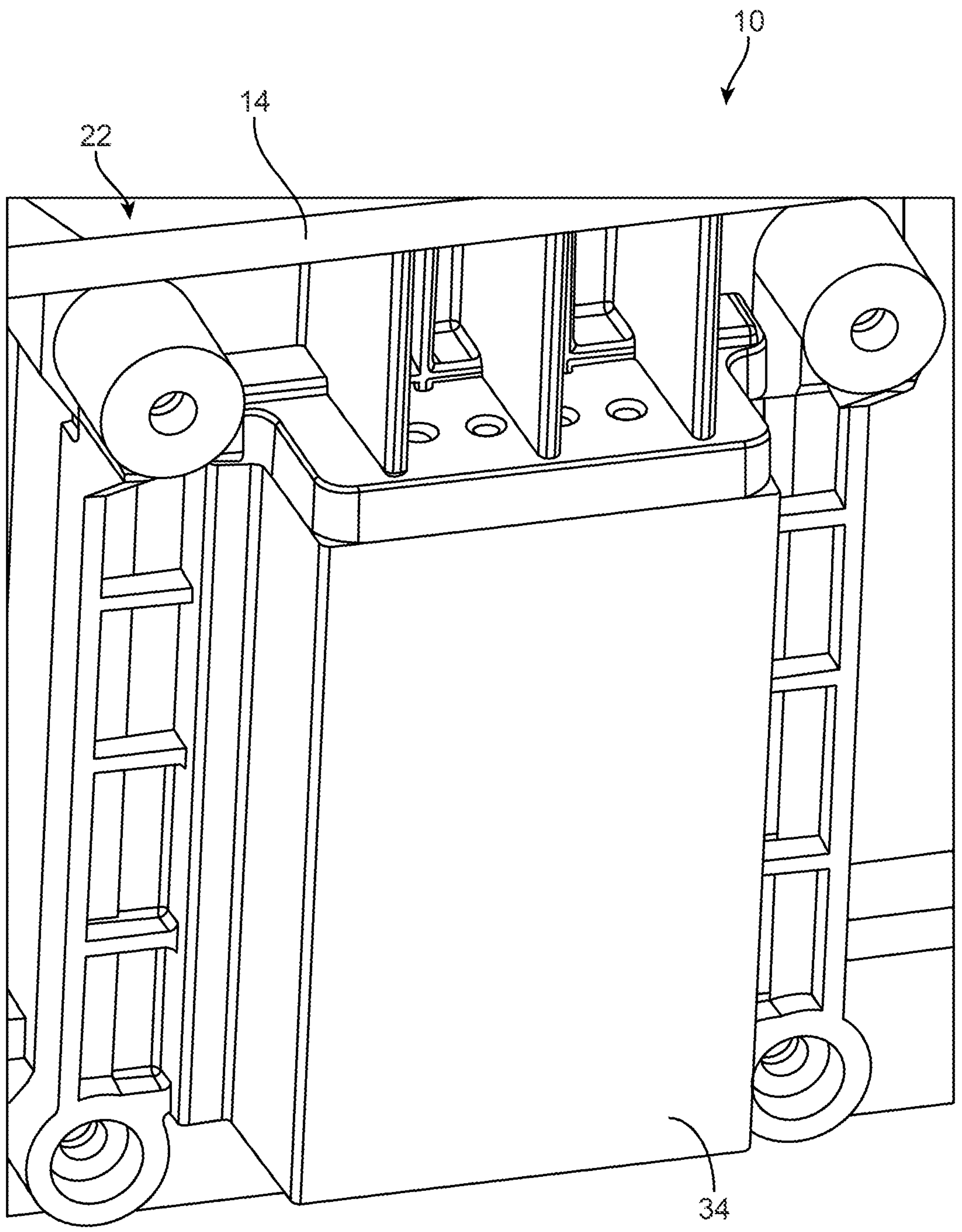
FIG. 2 is another perspective view illustrating a battery charger including a sealed interface according to FIG. 1.

As shown in FIG. 2, a receptacle 34 is coupled to the battery receiving interface 22, for instance by fasteners (not pictured), such as four screws at corners of the receptacle 34, which may engage bosses 36 extending from the housing 14. In other embodiments, the receptacle 34 may be coupled to the housing 14 in another manner, such as by snap engagement of the receptacle 34 with the housing 14.

Figure 3A:
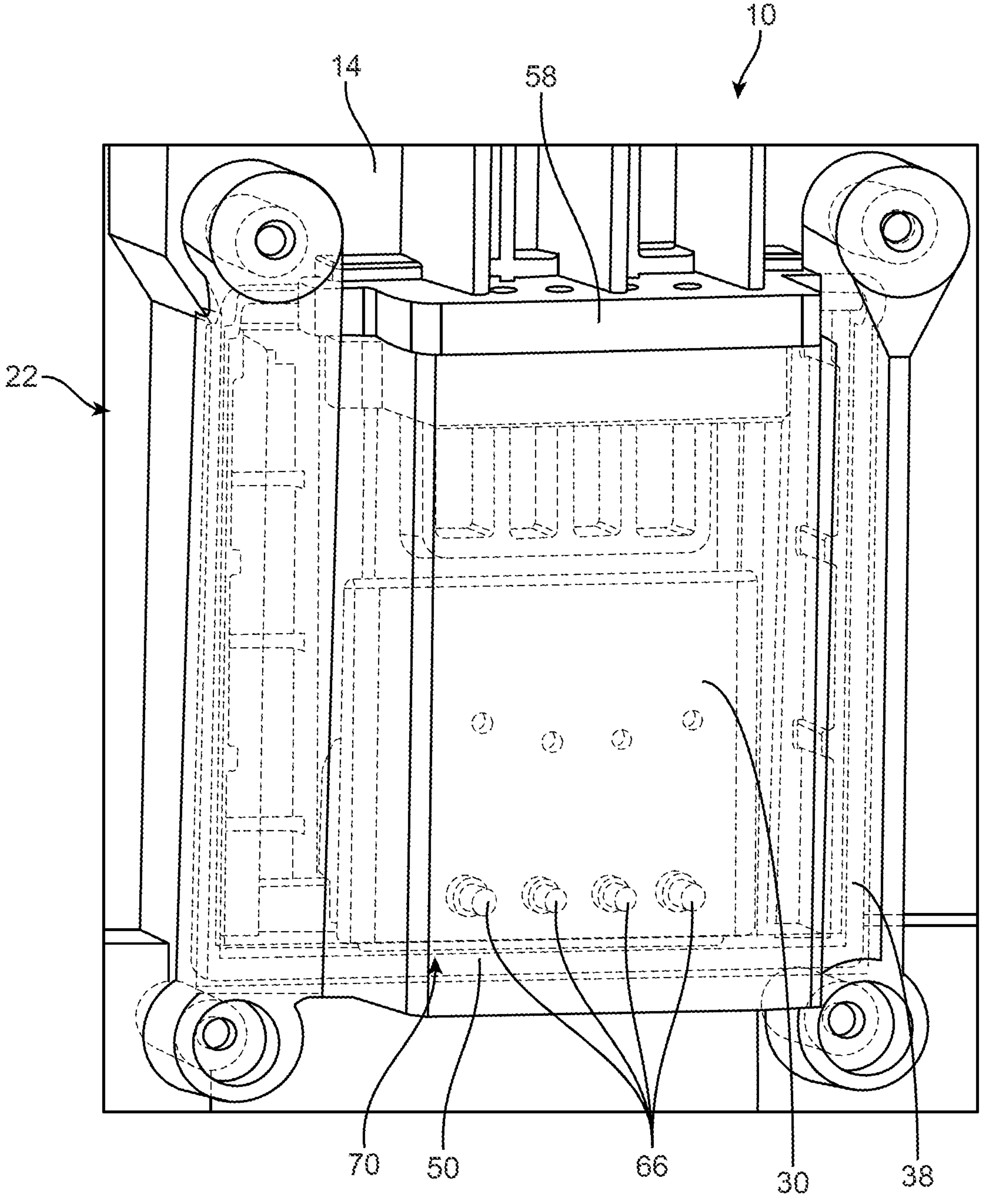
FIG. 3A is a section view illustrating the perspective view of a battery charger including a sealed interface according to FIG. 2.
Figure 3B:
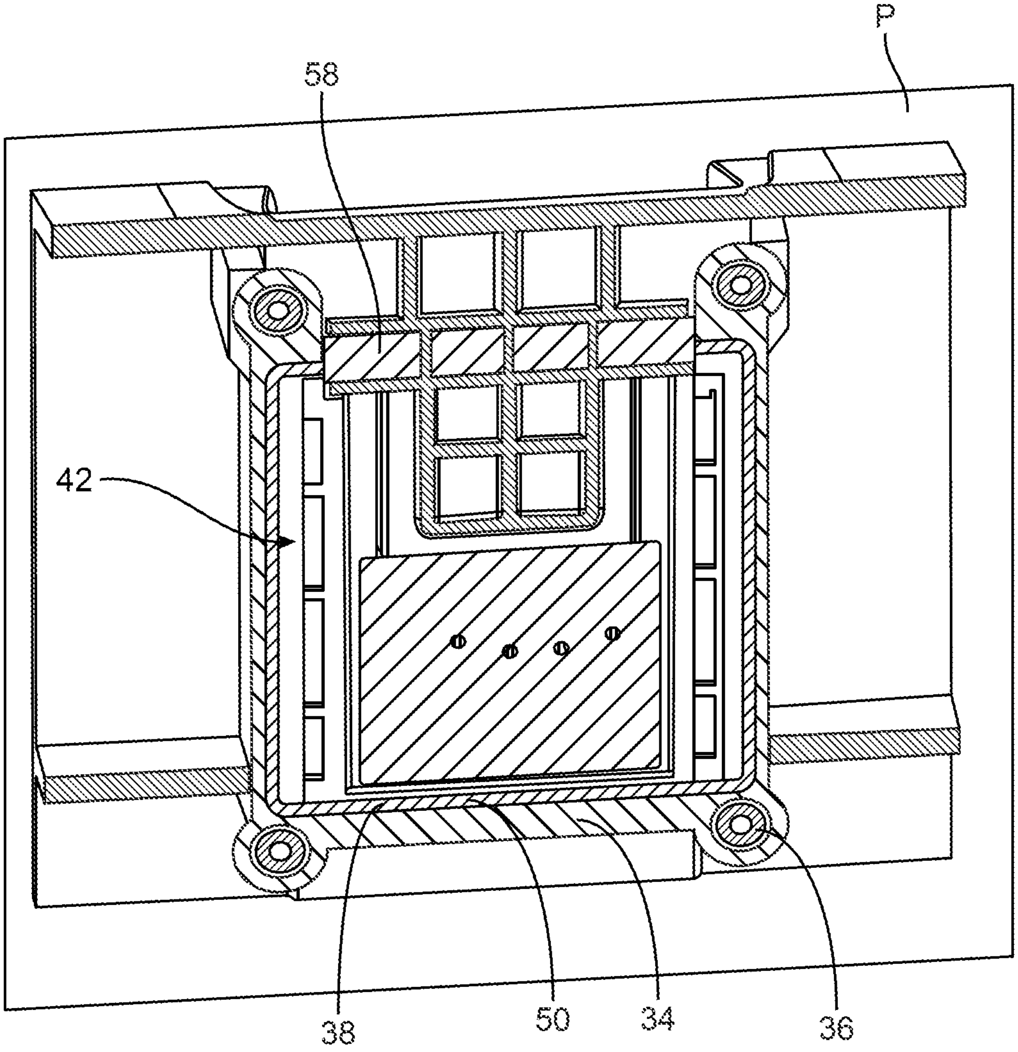
FIG. 3B is a section view illustrating the perspective view of a battery charger including a sealed interface according to FIG. 2.
Figure 4:
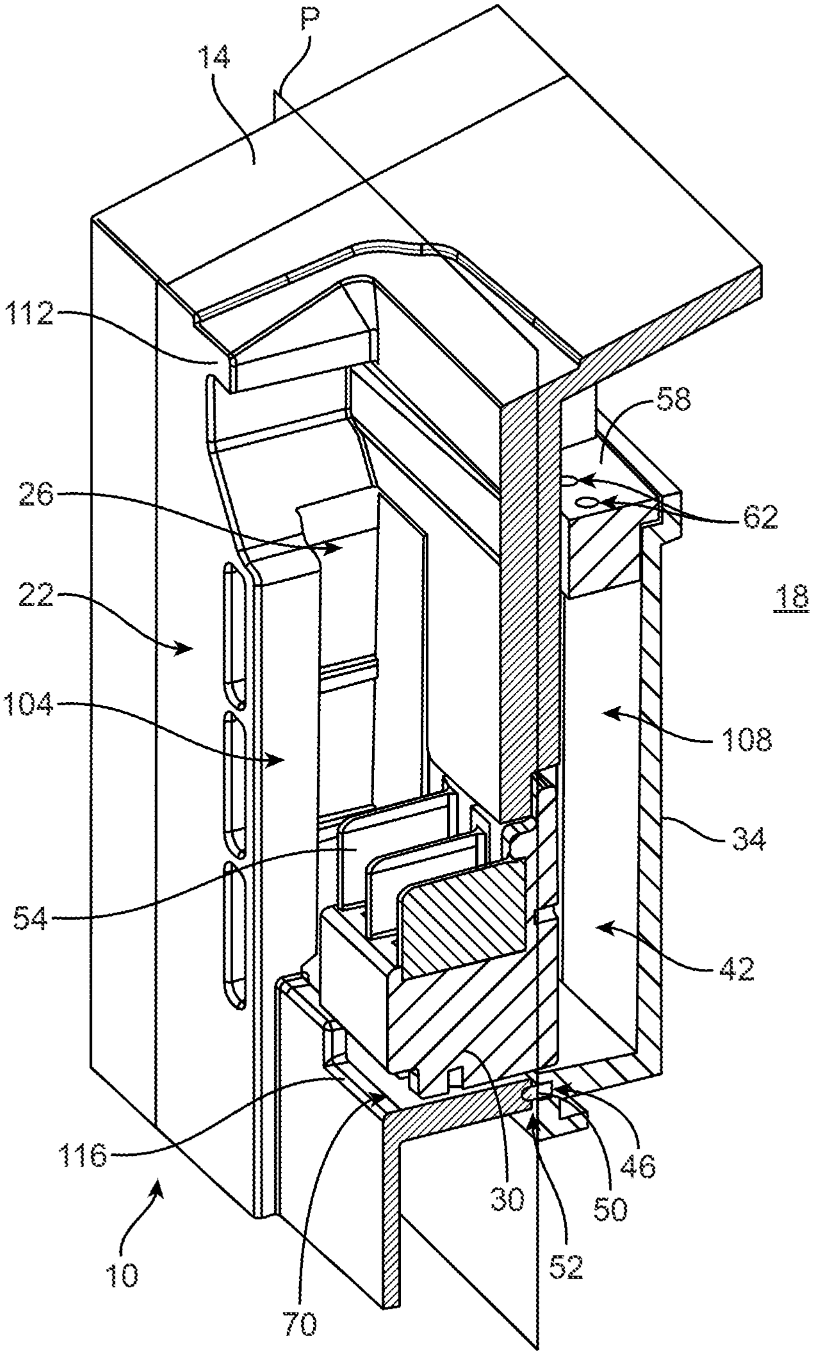
FIG. 4 is a section view illustrating a perspective of a battery charger including a sealed interface according to FIG. 1.

As shown in FIGS. 3A and 3B, a seal 38 is interposed between the receptacle 34 and the battery receiving interface 22. As illustrated in FIG. 4, the battery receiving interface 22, receptacle 34, and seal 38 cooperate to form a chamber 42. The receptacle 34 includes a channel 46 that extends about a majority of the perimeter of the receptacle 34. The seal 38 includes a gasket 50 that is disposed in the channel 46. The gasket 50 may be overmolded in the channel 46, that is, formed inside the channel 46 of the receptacle 34 by a molding process. The gasket 50 may instead be manufactured separate from the receptacle 34 and installed in the channel 46. The gasket 50 may be rubber or other elastomeric material, or other material suitable for sealing the interface 52 between the receptacle 34 and the battery receiving interface 22.

Figure 5:
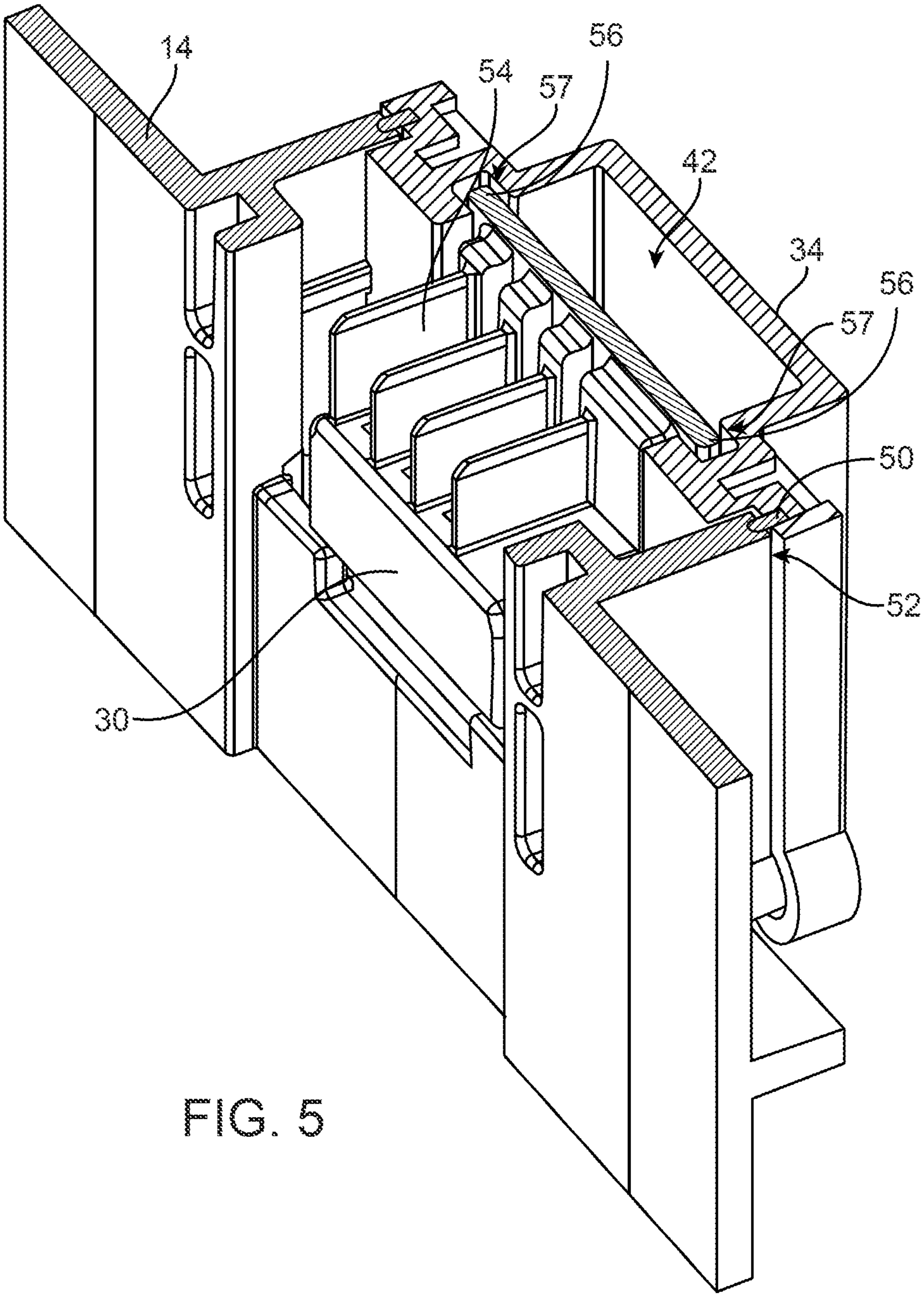
FIG. 5 is a section view illustrating a perspective view of a battery charger including a sealed interface according to FIG. 1.

The terminal block 30 includes at least one terminal fin 54 that extends in a direction away from the receptacle 34. As shown in FIGS. 3B and 4, the chamber 42 includes a rectangular cross-section in a plane P that is perpendicular to the direction in which the terminal fin 54 extends. The channel 46 extends along the plane around at least three side of the chamber 42. The gasket 50 disposed in the channel 46 extends along the plane P around at least three sides of the chamber 42. As illustrated in FIG. 5, the terminal block 30 may be supported by the receptacle 34, for instance by tabs 56 extending from the terminal block 30 that are supported in slots 57 defined in the receptacle 34. In other embodiments, the terminal block 30 may be coupled to the housing 14 in other ways.

With reference to FIGS. 3A, 3B and 4, in addition to the gasket 50, the seal 38 includes a grommet 58. The grommet 58 may be rubber or other elastomeric material, or other material suitable for sealing the interface 52 between the receptacle 34 and the battery receiving interface 22. The grommet 58 includes a plurality of holes 62. A plurality of wires 66 (e.g., four wires) extend from the terminal block 30, through the chamber 42, and through the grommet 58 to enter the cavity 18. The number of holes 62 may be equal to the number of wires 66 that extend through the grommet 58. The seal 38 is configured to reduce the amount of fluid entering the cavity 18 such as fluid introduced onto the battery charger 10. The plurality of wires 66 may be overmolded in the terminal block 30 for sealing the electrical connection between the wires 66 and the terminal fins 54.

As shown in FIGS. 3A and 4, a passage 70 is defined between the terminal block 30 and the battery receiving interface 22. The passage 70 is disposed between the battery receiving interface 22 and the terminal block 30, for instance, below the terminal block 30 opposite the terminal fin 54. The passage 70 is in fluid communication with the chamber 42.

With continuing reference to FIGS. 4 and 5, the battery receiving interface 22 includes an exterior receiving side 104 which receives the battery pack and an opposite interior side 108. The chamber 42 is disposed on the interior side 108. The chamber 42 is configured to receive and retain fluid, for instance, water, that has been introduced to the battery charger 10 at the exterior receiving side 104. By fluidly communicating the chamber 42, the passage 70 provides an outlet for fluids retained in the chamber 42 to drain from the chamber 42. A battery pack is slidingly coupled to the battery charger 10 by sliding from an introduction end 112 to a stop end 116, which is opposite the introduction end 112 of the battery receiving interface 22. The passage 70 is located at a distance from the stop end 116 that is shorter than a distance between the passage 70 and the introduction end 112. The passage 70 is positioned between the terminal block 30 and the stop end 116.

What is claimed is:

1. A battery charger to which a battery pack may be coupled, the battery charger comprising:

a housing including a battery receiving interface, the housing defining a cavity, the battery receiving interface defining a recess extending inwardly toward the cavity;

a terminal block disposed in the recess; and a receptacle coupled to the battery receiving interface, the receptacle including a seal interposed between the receptacle and the battery receiving interface, wherein the battery receiving interface, the receptacle, and the seal cooperate to form a chamber between the terminal block and the cavity, the chamber sealed from the cavity.

2. The battery charger of claim 1, wherein the receptacle further includes a channel defined therein, the channel extending about a majority of a perimeter of the chamber, the seal includes a gasket disposed in the channel.

3. The battery charger of claim 2, wherein the terminal block includes at least one terminal fin extending in a direction away from the receptacle, the chamber includes a rectangular cross-section in a plane perpendicular to the direction of the terminal fin, and the channel extends along the plane and around at least three sides of the chamber.

4. The battery charger of claim 3, wherein the gasket is overmolded on the receptacle.

5. The battery charger of claim 2, wherein the seal further includes a grommet.

6. The battery charger of claim 5, further including a plurality of wires extending from the terminal block, through the chamber, and through the grommet.

7. The battery charger of claim 6, the grommet including a plurality of holes defined therein, each hole corresponding to a respective wire.

8. The battery charger of claim 6, wherein the plurality of wires are overmolded in the terminal block.

9. The battery charger of claim 1, further comprising a passage defined between the terminal block and the battery receiving interface, the passage in fluid communication with the chamber.

10. The battery charger of claim 9, wherein the terminal block includes at least one terminal fin, and the passage is located on a side of the terminal block opposite the terminal fin.

11. The battery charger of claim 1, wherein the receptacle supports the terminal block.

12. A battery charger to which a battery pack may be coupled, the battery charger comprising:

a battery receiving interface, the battery receiving interface having an exterior receiving side and an opposite interior side;

a chamber disposed on the interior side, the chamber configured to receive and retain fluid introduced to the exterior receiving side of the battery receiving interface;

a terminal block disposed in the battery receiving interface; and a plurality of wires coupled to the terminal block, the plurality of wires extending through the chamber.

13. The battery charger of claim 12, wherein the plurality of wires are overmolded in the terminal block.

14. The battery charger of claim 12, wherein the battery receiving interface includes an introduction end and a stop end opposite the introduction end, and a passage defined between the terminal block and the battery receiving interface, a distance between the passage and the stop end is shorter than a distance between the passage and the introduction end, the passage is in fluid communication with the chamber.

15. The battery charger of claim 14, wherein the passage is between the terminal block and the stop end of the battery receiving interface.

16. The battery charger of claim 15, the battery receiving interface further comprising a sealing interface encompassing the chamber.

17. The battery charger of claim 16, the sealing interface including a gasket, the gasket encompassing a majority of the chamber.

18. The battery charger of claim 17, wherein the gasket is overmolded with the battery receiving interface.

19. The battery charger of claim 16, wherein the sealing interface includes a grommet through which the plurality of wires extend, the grommet being positioned closer to the introduction end than to the stop end.

20. A battery charger to which a battery pack may be coupled, the battery charger comprising:

a housing including a battery receiving interface, the housing defining a cavity, the battery receiving interface defining a recess extending inwardly toward the cavity;

a terminal block having a plurality of wires extending therefrom, the terminal block disposed in the recess;

a passage defined between the terminal block and the battery receiving interface;

a receptacle coupled to the battery receiving interface, the receptacle including a channel defined therein; and a seal interposed between the receptacle and the battery receiving interface, the battery receiving interface, the receptacle, and the seal cooperate to form a chamber between the terminal block and cavity, the channel extending about a majority of a perimeter of the chamber, the chamber in fluid communication with the passage, the seal having:

a gasket disposed in the channel, the gasket being overmolded on the receptacle, and a grommet having a plurality of holes through which the plurality of wires extend, the grommet interposed between the receptacle and the housing.

* * * * *